Oct. 5, 1948.  J. L. BROCK  2,450,539

DOLLY WHEEL PLATE

Filed July 22, 1947

INVENTOR:
JOSEPH L. BROCK
BY
O. O. Martin,
ATTORNEY.

Patented Oct. 5, 1948

2,450,539

UNITED STATES PATENT OFFICE 2,450,539

DOLLY WHEEL PLATE

Joseph L. Brock, Arcadia, Calif.

Application July 22, 1947, Serial No. 763,290

2 Claims. (Cl. 188—32)

This invention relates to a device for maintaining a vehicle wheel firmly locked in position on the ground to prevent the wheel from rolling when the body of the vehicle is held elevated by means of a screw jack or the vehicle is parked on some particular spot when not in use for traveling and is particularly designed for use in combination with caster wheels of trailers and the like.

Devices which often are referred to as chocks, have been made applicable to vehicle wheels to prevent such wheels from rolling while the vehicle is being jacked up for tire changing or similar purposes. While such devices may operate satisfactorily in connection with ordinary vehicle wheels, they have not been found sufficient to maintain caster wheels, such as used on automobile trailers, firmly in position on the ground due to the fact that such caster wheels are free to swing on their pivots and will be induced by displacement of the weight of the vehicle body to swing away from the type of chock ordinarily used.

In view of the foregoing, it is the object of the present invention to provide a device which is designed firmly to lock a caster wheel not only against rotating movement on its axle but also against swinging movement on its pivot. It is a further object to provide a device of the type referred to which is adjustable not only to the diameter of the wheel to be held in position but also to the width of the tire on the wheel. With these and further objects in view the invention resides in the combinations herein fully described and illustrated in the accompanying drawings, of which:

Figure 1:
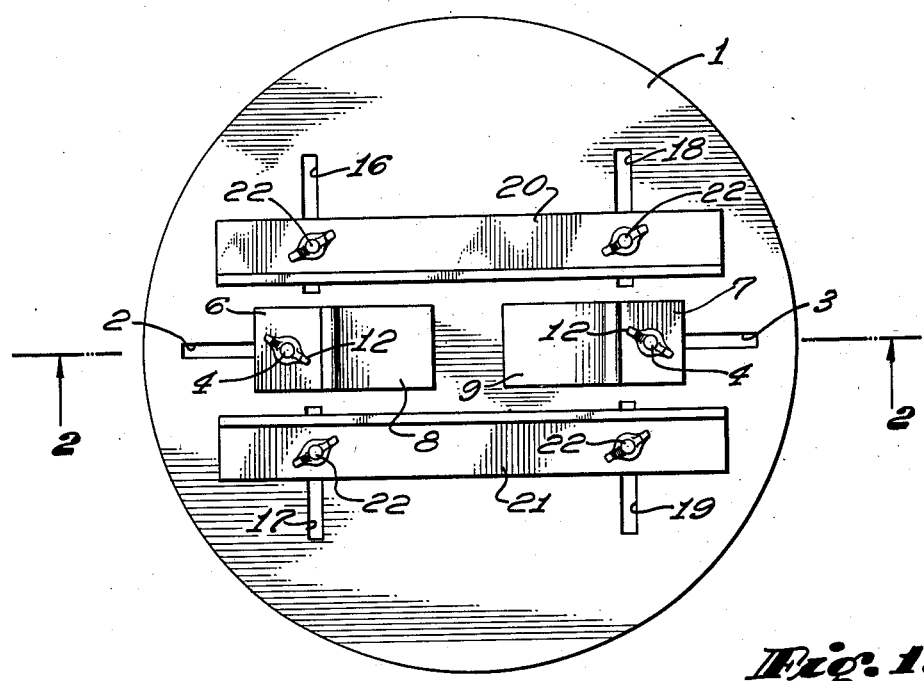
Fig. 1 is a plan view of a device embodying the invention.
Figure 2:
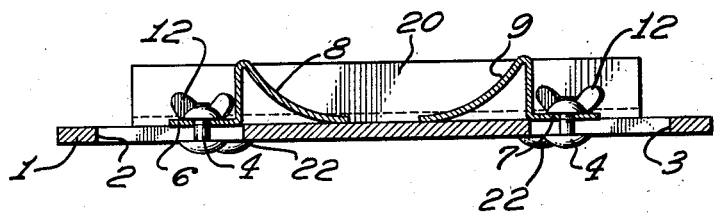
Fig. 2 is a side elevational view thereof taken substantially on line 2—2 of Fig. 1 in the direction of the arrow.

The device of the invention in the form illustrated in the drawings includes a base plate 1 which preferably is made circular in shape and which is provided with diametrically aligned perforations 2, 3, through which extend bolts 4, for the purpose of clamping wheel blocks 6, 7 rigidly in position on the base. These wheel blocks are for convenience made from strips or bars of sheet metal, the inner surfaces 8, 9 of which are shaped to receive the peripheral surfaces of the wheel. The outer ends of the blocks are shown angularly bent to form flat bases which are perforated to receive the bolts 4, and against which the nuts 12 may be securely clamped. It is to be understood that the perforations 2, 3 should be long enough to allow for adjustment of the wheel blocks to suit wheels of various diameters.

Referring now to Fig. 1, it is noticed that two parallel sets of longtitudinally aligned perforations 16, 17, 18 and 19 are cut through the base perpendicular to the center line through the perforations 2, 3 and that these sets of perforations are equidistantly located about half way between the center of the base and the outer periphery thereof. A pair of angle bars 21 are mounted on the base by means of bolts 22 which extend through the angle bars and the said two sets of perforations for the purpose of clamping the bars in position on the base in transversely adjusted relation to the wheel blocks and it is important to note that the vertical flanges of these angle bars take positions adjacent the wheel blocks.

In operation the wheel blocks of the angle bars are in the first instance spread far enough apart freely to admit therebetween the caster wheel which it is desired to lock in position, whereupon the angle bars may be drawn together properly to align the wheel with the wheel blocks and clamped tightly in position. The wheel blocks are thereupon pushed together against the peripheral surfaces of the wheel and tightly clamped in position. It may then be advisable slightly to unscrew the bolts 22 and lightly to press the angle bars against the sides of the wheel causing the bars to become firmly and finally clamped in position. When the wheel is held in position, as above described, it is impossible for it to move in any direction and it will safely maintain the trailer in standing position on the ground for an indefinite period of time or elevated by a screw jack for other purposes.

I claim:

1. A wheel clamp including a circular base having a pair of longitudinal diametrically aligned perforations therein and two pairs of parallel longitudinal perforations perpendicular to the aforenamed perforations and symmetrically positioned intermediate in the center of the base and the periphery thereof, a pair of wheel blocks having perforations at the outer ends thereof, bolts seated in said diametrically aligned perforations and extending through the perforations of the blocks for the purpose of clamping the blocks in adjusted position on the base, a pair of angle bars having perforations therethrough for registration with said sets of perpendicular perforations, and bolts seated in the latter and extending through the perforations of said bars to lock the bars in properly adjusted position relative to the wheel blocks.

2. A wheel clamp including a circular base having a pair of longitudinal diametrically aligned perforations therein and two pairs of parallel longitudinal perforations perpendicular to the aforenamed perforations and symmetrically positioned intermediate in the center of the base and the periphery thereof, a pair of wheel blocks mountable on the base, said blocks being made with opposed inclined surfaces shaped to receive the peripheral tread of the wheel and having perforations at the outer ends thereof, bolts seated in said diametrically aligned perforations and extending through the perforations of the blocks for the purpose of clamping the blocks in adjusted position on the base, a pair of angle bars having perforations therethrough for registration with said sets of perpendicular perforations, and bolts seated in the latter and extending through the perforations of said bars to lock the bars in properly adjudged position relative to the wheel blocks.

JOSEPH L. BROCK.

REFERENCES CITED

The following references are of record in the file of this patent:

UNITED STATES PATENTS

| Number | Name | Date |
|---|---|---|
| 2,104,186 | Clausen | Jan. 4, 1938 |

FOREIGN PATENTS

| Number | Country | Date |
|---|---|---|
| 418,144 | Germany | 1925 |